United States Patent
Clegg et al.

(10) Patent No.: US 8,677,095 B2
(45) Date of Patent: Mar. 18, 2014

(54) SYSTEM AND METHOD FOR OPTIMAL DYNAMIC RESOURCE ALLOCATION IN A STORAGE SYSTEM

(75) Inventors: Roger T. J Clegg, Wichita, KS (US); Brad D. Besmer, Colorado Springs, CO (US); Guy Kendall, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 678 days.

(21) Appl. No.: 12/313,595

(22) Filed: Nov. 21, 2008

(65) Prior Publication Data
US 2010/0131734 A1 May 27, 2010

(51) Int. Cl.
*G06F 12/06* (2006.01)

(52) U.S. Cl.
USPC .............. 711/170; 711/103; 711/153; 714/30

(58) Field of Classification Search
USPC ....................................................... 711/170
See application file for complete search history.

(56) References Cited

U.S. PATENT DOCUMENTS

2006/0095664 A1* 5/2006 Wichelman et al. .......... 711/114
2007/0130423 A1* 6/2007 Liu et al. ...................... 711/114

* cited by examiner

*Primary Examiner* — Alford W. Kindred
*Assistant Examiner* — Ramon A Mercado
(74) *Attorney, Agent, or Firm* — Suiter Swantz pc llo

(57) ABSTRACT

An apparatus and method to allocate memory in a storage system. Firmware running the method uses an iterative approach to find the best optimal memory configuration for a particular storage system given a variety of configuration data parameters stored as persistent data in non-volatile flash memory. The configuration data relates to resources in the environment that the storage system is found in, such as the number of virtual ports, targets and initiators supported by a storage system IOC. The configuration data is alterable, to allow flexibility in updating and changing parameters, and is employed at runtime when the storage system powers on, to enable the most flexible resource allocation. In a preferred method of determining the most optimal memory configuration for a given set of parameters corresponding to a given set of resources, an iterative method is employed to decrement parameter values from their maximum values, taking into account the minimums, and then testing the configuration by performing a memory allocation. If the allocation fails, because for example the wrong type memory or size of memory for any of the resources found, then the firmware resets the memory areas back to predetermined Start of Day (SOD) parameter values, decrements the values until a successful configuration of memory is found for the given set of parameters, and tries again, or until the firmware is caused to fault, whichever comes first.

16 Claims, 2 Drawing Sheets

| Byte | 3 | 24 23 | 2 | 16 15 | 1 | 8 7 | 0 |
|---|---|---|---|---|---|---|---|
| 0x00 | PageType | | PageNumber | | PageLength | | PageVersion |
| 0x04 | MaxAttempts | | | | | | |
| 0x08 | NumResources | | | | | | |
| 0x0C | Reserved | | | | | | |
| 0x10 | Reserved | | | | | | |
| 0x14 | Resource[0] | | | | | | |
| ... | | | | | | | |
| 0x68 | | | | | | | |
| 0x6C | Resource[NumResources-1] | | | | | | |
| ... | | | | | | | |

FIG. 2

| Byte | 3 | 24 23 | 2 | 16 15 | 1 | 8 7 | 0 |
|---|---|---|---|---|---|---|---|
| 0x04 | Maximum | | | | | | |
| 0x08 | Decrement | | | | | | |
| 0x0C | Minimum | | | | | | |
| 0x10 | Actual | | | | | | |

FIG. 3

SYSTEM AND METHOD FOR OPTIMAL DYNAMIC RESOURCE ALLOCATION IN A STORAGE SYSTEM

CROSS-REFERENCE TO RELATED APPLICATIONS

[none]

BACKGROUND OF THE INVENTION

1. Field of Invention

The present invention relates generally to the art of resource allocation during startup by a storage system controller.

2. Description of Related Art

RAID (Redundant Array of Independent Disks) is a storage system used to increase performance and provide fault tolerance. RAID is a set of two or more hard disks and a specialized disk controller that contains the RAID functionality. RAID improves performance by disk striping, which interleaves bytes or groups of bytes across multiple drives, so more than one disk is reading and writing simultaneously (e.g., RAID 0). Fault tolerance is achieved by mirroring or parity. Mirroring is 100% duplication of the data on two drives (e.g., RAID 1).

A volume in storage may be a logical storage unit, and in a RAID system is typically part of one physical hard drive or one that spans several physical hard drives. An "enclosure" in the computer data storage context is a physical collection of storage drives, typically arranged by physical unit number rather than a logical unit number. Logical unit number (LUN) is the number assigned to a logical unit of a storage drive; a logical unit is a SCSI protocol entity.

A Storage Area Network (SAN) often connects multiple servers to a centralized pool of disk storage. A SAN can treat all the storage as a single resource, improving disk maintenance and backups. In some SANs, the disks themselves can copy data to other disks for backup without any computer processing overhead. The SAN network allows data transfers between computers and disks at high peripheral channel speeds.

A boot sector is one or more reserved sectors on disk that are used to load the operating system of a computer. On startup, the computer looks for the master boot record (MBR) or something similarly named, which is typically the first sector in the first partition of the disk, and contains the program that reads the partition table which points to the first sector that contains the operating system. That sector contains another small program that causes the computer to read the operating system. Often these programs are referred to as images, as in binary data images comprised of 0s and 1s.

SAS, or Serial Attached SCSI, is a serial version of the SCSI interface. SAS was ratified by ANSI in 2003. SAS is a point-to-point architecture that uses a disk controller (host bus adapter) with four or more channels that operate simultaneously. SAS also supports Serial ATA (SATA) drives, which can be mixed with SAS drives.

Memory allocation used as a verb is reserving memory for specific purposes. Operating systems and applications generally reserve fixed amounts of memory at startup and allocate more when the processing requires it. Configuring memory is the process of memory allocation, typically on startup; a memory configuration (or a memory allocation) is the particular state or characteristics of memory after the act of memory allocation (e.g. the size, type, speed and the like of memory).

Virtual memory in the context of the present field of the invention is the mapping within the processor's view of the memory and physical memory space is the mapping on the bus to which the various chip cores are attached.

Resources include any data, hardware, software or other construct important in hard drive controller cards or chips. By way of example, a resource could be cached memory, physical ports, phys (hardware interfacing a link layer device or MAC to a physical medium) and the like. The resources consume memory. The resource is a way to describe how many of a particular type of thing the firmware supports, such as number of targets, number of initiators and the like, where targets and initiators consume resources.

Start of Day (SOD) is the time from PCI or chip reset to the time that firmware is ready to respond to non-configuration space or other than config space (non-configspace) accesses. SOD is a time. SOD is the time from the moment after the reset deasserts and the processor starts running until the firmware is ready to accept memory accesses (non-configspace) from PCIe. More generally, it is during this time that a test finds what memory is available for resources to be allocated in memory, permanently (or until the next power cycle/reboot). Memory allocated during SOD is not available later on during the same power cycle.

The following acronyms are used in the description of the present invention: IRI (Integrated RAID Interface), IOP (IO Processor), IOPI (IOP Interface), PLI (Protocol Layer Interface), SOD (Start of Day), and IOC (IO Controller, for a single driver controller instance). SSP stands for Serial SCSI Protocol and SMP stands for Serial Management Protocol. I/O or IO generally refers to Input/Output, or the transferring of data between the CPU and a peripheral device. In the storage context, a hard drive or other secondary memory storage vehicle can be thought of from the controller card or chip's point of view as comprising a plurality of IO's, which collectively form the storage, and each comprising a unique address that can be reached by the microprocessor on the chip. Such plurality of IO's are often terms "host credits" or "global credits", and can typically be around 64 k in memory size and can number several thousand. A "host" can be any piece of hardware making a communications request from another piece of hardware, called the "target", while an "initiator" can be a host that starts an IO data transfer, e.g., a hard drive controller card or chip. The "host" talks to a storage controller which may be a SCSI target or a SCSI Initiator. Frame or message frame, in communications, refers to a fixed block of data transmitted as a single entity. Hexadecimal (HEX) is the mathematical radix base (power of 16). PBSRAM stands for Pipelined Burst Synchronous RAM. Fibre Channel (FC) is a high-speed transport technology used to build storage area networks (SANs).

In the existing art in storage products, firmware needs to expand to maximize the use of memories found in a given system; adjust to the needs of various architectures with differing hardware and hardware requirements, including but not limited to DMA capability, speed and advanced memory features (e.g. tightly coupled memory, data catch et. al), and to account for different memory type capabilities. Further, since current configurations are fixed, releases become complicated due to the need to create multiple fixed builds based on target hardware, customer demands and other parameters. The parameters vary based upon application. Some other parameters may include frame size (buffers used for communication), debug resource allocation (buffers in general), virtual functions and virtualization resources (zero if off, non-zero if on) and the like, as is obvious to one of ordinary skill from the teachings herein.

Existing solutions to the problem of configuring storage products at boot up during runtime include having multiple fixed configurations, with one firmware configuration for each target system. The existing solutions are not desirable due to the complex maintenance required to maintain the different configurations due to hardware revisions, vendor changes and other parameters.

A FC (Fibre Channel) modification of existing solutions includes having a fixed array of parameters as structures which are assessed via various configuration parameters and a single fixed memory size. Although this is more flexible than having multiple builds for fixed configurations, nevertheless, this existing solution is not programmable by the user and does not adjust itself to varying memory configurations and sizes, like the present invention.

In existing art solutions maintenance of multiple builds requires a great deal of work to track all the differing build parameters, verify they are correct, and test each build. Further, once the builds are created, applications have to ensure that the correct images are programmed on the correct devices with similar features. For example, in these existing solutions RAID firmware should not be programmed over ordinary controller firmware.

While these above mentioned FC existing implementations are better than what came before, they can only support a limited number of configurations based upon input parameters. As the number of protocols, memory types and sizes increases, the amount of storage necessary to maintain the array of structures offered by these existing solutions grows, and becomes difficult to maintain due to the constant instantiation of the data required. Further, none of these existing solutions supports the capability to handle varying memory configurations and types.

What is lacking in the prior art is a method and apparatus for an improved system to allocate resources flexibly, and which can be used to allocate resources without expert input, automatically and programically, as required by storage systems firmware, such as taught in the present invention.

SUMMARY OF THE INVENTION

Accordingly, an aspect of the present invention is an improved apparatus and method to allow a programmable and configurable configuration page comprising an array of configuration parameters, which specify a plurality of resources and form an array of resource descriptors, to provide configuration data to a memory configuration (or allocation) method, that allows any hardware and/or software, such as a controller chip operating the present invention, to allocate memory in a storage system to fit the maximum number of resources for any given environment, in a dynamic or adaptive method.

An aspect of the present invention is an apparatus and method to allocate memory in a storage system. Firmware running the method uses an iterative approach to find an optimal memory configuration given a variety of configuration data parameters stored as persistent data in non-volatile flash memory. The configuration data relates to resources in the environment that the storage system is found in, such as the number of virtual ports, targets and initiators supported by a storage system IOC. The configuration data is changeable, to allow flexibility in updating and changing parameters, and is employed at runtime when the storage system powers on, to enable the most flexible resource allocation. In a preferred method of determining an optimal memory configuration for a given particular set of parameters corresponding to a given set of resources, an iterative method is employed to decrement parameter values from their maximum values until a successful memory configuration is achieved for a particular predetermined set of parameters corresponding to a given set of resources, or until the firmware is caused to fault.

A further aspect of the present invention is an apparatus and method for a configuration page that is programmable via a default structure external to the firmware, such as in a controller card and which is also programmable at runtime when flash memory is available. The defaults structure is preferably a structure written in C language code.

Another aspect of the present invention is that every member of the array that comprises the configuration page describes a different resource required by the firmware, such as number of targets, number of initiators, host credit and the like. Each member of the array has a minimum (min), maximum (max) and decrement field. The firmware starts with the maximum parameters and calculates sums of the resources needed by a resource type (e.g., cached memory, physical ports and the like). The firmware then will verify that a configuration desired is possible. If the desired configuration is not possible, based upon memory or other resources and resource limitations, the firmware acting according to the method of the present invention will decrement the values of the parameters in question based upon a decrement value, down to a predetermined minimum. The process continues until a valid configuration is determined (or a fault occurs). The minimum values achieved using this process should reflect a basic configuration that will work with the minimum possible resources for a particular target system.

Thus an aspect of the present invention is the capability to handle multiple resources and/or memory types, which are programmable with defaults and at runtime. The present invention can support fixed resource sizes, variable resource sizes and minimum or default resource sizes. The present invention is able to handle a massive number of possible configurations, unlike in prior systems. Consequently, one collection of parameters can be made, using the method of the present invention, to work for multiple configurations with varying resources. Only one firmware image may be used to configure this myriad of configurations.

A further aspect of the present invention is to disclose an adaptive method of determining optimal resource allocation for a plurality of memories. Though more difficult and not as optimal, it is possible, however, to create an equation that will perform the same function as the method disclosed herein, without detracting from the scope of the present invention.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

FIG. 2 is a schematic of a data format for the present invention.

FIG. 3 is a schematic of a data format for the present invention.

Figure 1:
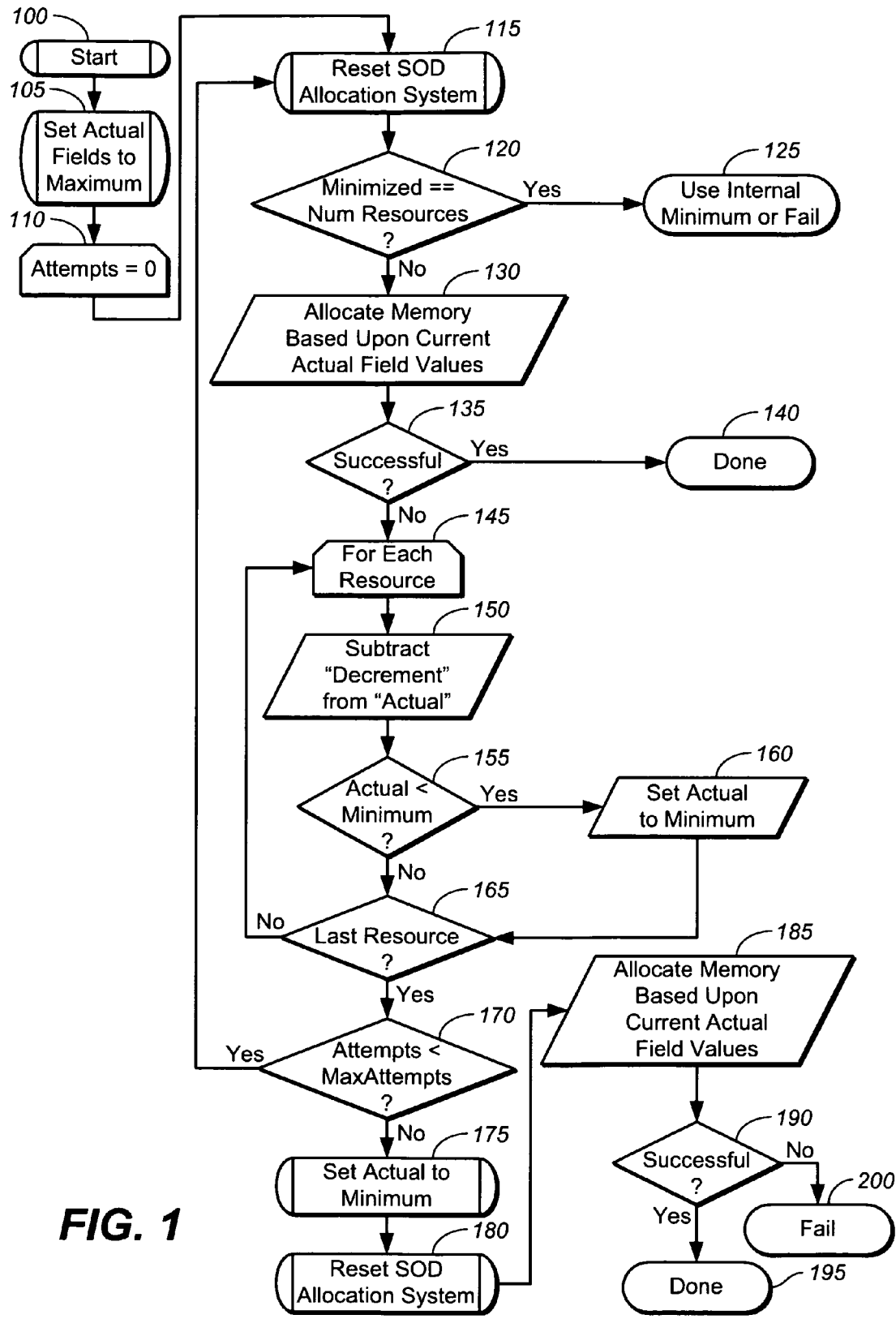
FIG. 1 is a flowchart for the process of memory configuration for the present invention.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The present invention is preferably firmware running in a specialized integrated circuit or ASIC, which forms a storage controller (e.g., RAID controller, SCSI controller such as FC, iSCSI, SAS and the like), with the firmware written in the C language. However, any software tool may be employed to write and compile the present invention, which may be written in any computer language, including an object-oriented language like C++. Further, the firmware may be replaced by, and is synonymous with, any combination of hardware and/or software, such as a computer system, with the computer having primary and secondary memory storage. In general, depending on the language used to construct and implement the software of the present invention, any software used to construct the present invention may have, in source code or machine language, any number of classes, functions, subroutines, objects, variables, templates, module(s), lines of code, portions of code and constructs (collectively and generally, and as depicted by the flowcharts herein, "a process step", "step", "process", "block", "block step", "application", "instructions", "program instructions", "module" or "software module") to carry out the invention in successive stages as described and taught herein, and may be either a standalone software application, or employed inside of or called by another software application. The software process or software module may be constructed so that one portion of code in the application performs a plurality of functions, as for instance in Object Oriented programming (e.g., an overloaded process). The converse is also true in that a plurality of software modules or process steps may be constructed to perform the function of a single process step described herein, without loss of generality for the present invention. At any stage of the process step of the present invention, intermediate values, variables and data may be stored for later use by the program. In general, the method and apparatus of the present invention may employ any kind of hardware to run the software embodying the present invention, not only firmware in an integrated circuit chip, but including but not limited to a personal computer, ARM processor, XScale processor, DSP, ASIC or programmable platform ASIC, FPGA, GPP, microprocessor, mainframe, dedicated circuit with memory, or any other compatible piece of hardware or virtual machine.

Turning attention to FIG. 1, there is shown a flowchart for the method of allocating memory in accordance with the present invention. The present invention has three distinct types of memory in the proposed system: memory allocated at fixed locations by the linker forming the present invention; memory allocated at the SOD (Start Of Day) and owned by the requester until the next reset; and memory allocated temporarily. The second memory, allocated at SOD, is referred to as "statically allocated memory" and the third memory, allocated temporarily, is referred to as "dynamically allocated memory".

In the present invention, there is a preferred method to allocate memory for a storage system based on data from a specified runtime configuration. For the purposes of this invention, runtime configuration is the data used to determine what memory is allocated at the SOD for the various resources. Runtime configuration is used to specify various parameters that determine device, internal and (optional) external (PBSRAM/DDR) memory support. The present invention provides a method by which memory may be allocated for the end usage of a storage system based on runtime configuration data relating to the storage system and accessed by the method of the present invention. For example, if the OEM desires to only support up to 96 target devices, this can be stored in the runtime configuration data, and then memory only needs to be allocated for this number of devices; if less than 96 devices are to be supported, then a different memory need be allocated, while if more than 96 devices, yet another memory configuration. The runtime configuration data can be stored in non-volatile memory and changed at any time, in a flexible manner. Firmware that incorporates the present invention is thus able to determine a memory configuration or configuration for a plurality of storage systems, each storage system having its own set of runtime configuration data. Prior implementations (e.g., LSI corporation's SAS Gen 1 Firmware) provided a few "hard-coded" parameter tables that could be selected by the OEM. This was determined to not be flexible enough to deal with all use cases.

Further, this new runtime configuration method allows for upgrade to newer firmware builds that contain new features, thereby requiring additional code and data space, and having the firmware automatically "reduce" one or more parameters by a defined process until the resulting amount of memory needed is satisfied.

The parameters necessary to perform the runtime configuration process are found in the layout and content of LSI's so-called Manufacturing Configuration Page 9 ("MP9"), which provides parameters necessary to perform the runtime configuration process. The MPT (Message Passing Transport) Specification for this page defines the page as containing read-only product specific data. The implementation is determined by the particular needs of the controller and firmware. The default values for this information are set in the NVDATA file. The NVDATA file is a C-language construct (e.g. a structure, or can be an array, or more generally a software construct) that collects and houses the parameters. The NVDATA file is compiled and stored as firmware on the storage controller chip of the present invention, or stored as non-volatile memory (e.g. flash memory). The NVDATA file may be upgradable through suitable software and hardware means, e.g. an I/O port leading to non-volatile memory.

NVDATA is a name for a set of data which defines the working defaults of a given firmware image. NVDATA is a set of default values for the firmware to use. The NVDATA provides default values; if the firmware determines there is appropriate non-volatile storage available such as FLASH it may allow the host to modify the working values via the MP9 configuration page mechanism. It is also possible to change the volatile stored information (in RAM) of some values and use them as working values. During SOD a method is provided for any hardware and/or software talking through PCI to the chip to modify the pages (if they are not read only). All NVDATA pages are considered "persistent" and may be modified in volatile or non-volatile manner depending on the storage medium available; thus the NVDATA forming the runtime configuration data is persistent data that is alterable and modifiable during operation of the hardware and software operating the present invention, to store runtime configuration data for a plurality of OEM manufactures using the present invention, in a flexible manner.

The NVDATA itself is considered to be the default of the firmware. However it is attached to the firmware image after compilation and can be changed or altered at build time. Users may also alter the actual values used by the firmware via the MP9 configuration pages.

The present invention runtime memory configuration in accordance with MP9 has the following three preferred specification requirements:

1. The runtime configuration method of the present invention shall provide a way to enforce exact resource parameters that must work or cause the firmware to fault/FAULT (e.g., stop and indicate an error);
2. the method of the present invention shall provide a single firmware image to intelligently allocate memory at the start-of-day (SOD) based upon input parameters and detected memory types and sizes;
3. the method of the present invention shall provide a method to specify minimum parameters which is used in order to attempt to allow firmware to operate in a minimal fashion. This may be used as "default" parameters set so that the card may be reconfigured without undue effort.

Thus, turning attention now to the flowchart of FIG. 1, there is shown the preferred runtime memory configuration method of the present invention for determining a memory configuration to allocate the memory upon startup, in order to fit the maximum amount of resources present in a storage system, and give the user of the present invention, typically an OEM manufacturer, the maximum control over the storage system environment; the present invention allocates the storage system memory based on runtime configuration data which may be programically stored and altered in non-volatile (flash) memory. It should be understood by one of ordinary skill in the art from the teachings herein that the FIG. 1 flowchart is a high-level flowchart, and other steps may be contained within the method steps shown therein. The flowchart of FIG. 1 is but a representation of the present invention; other flowchart representations are also possible, using for example a UML (Universal Modeling Language) diagram, with or without an activity diagram.

Generally, the method of the present invention is applied to each of an array of resource descriptors. One can reach the minimum value for a single resource before the other resources are at minimum values. Finally if all of them go to minimum values, and the allocation of memory experiment fails, then one can apply parameters internal to the firmware (not necessarily included as part of the other parameters) to achieve a memory configuration, or, one can reach a fault condition and fail.

At startup, at the method step 100, labeled "Start", the program embodied in the present invention starts, which in a preferred embodiment is firmware and/or non-volatile memory, holding program instructions embedded in a storage controller chip. In method step 105, labeled "Set Actual Fields to Maximum", the program gets parameters from memory, derived from a C-language structure explained further herein, termed "Manufacturing Page 9" (MP9), and preferably a C-language structure.

The MP9 page contains parameters to control internal controller memory configuration, the parameters based on resources, as described further herein. Thus the program of the present invention, preferably stored in the firmware, is able to determine a plurality of memory configurations for a plurality of storage systems, with a particular memory configuration for a particular storage system, with each storage system based on and defined by a given set from the collection of parameters, such as the collection of parameters found in MP9. In this way the storage systems of several OEM manufacturers, the end users of the present invention are able to be accommodated by the present invention in a flexible manner, in contrast to prior ways of allocating memory. The present invention also has the ability to handle multiple memory types. One type of memory type can be DMA-able. By this one means that both hardware and firmware have access to the memory and that the physical address is known and easy to obtain from the virtual address. Various differing memory speeds and types can be accommodated by the present invention. Some memories are fast but have an inherent delay in the single-word access mechanisms (such as DDR) while some memories can be extremely fast and be DMA-able (such as internal SRAM). Some memories are processor specific and fast (such as locked data cache) but not DMA-able. In any event, the present invention can accommodate all these memories and any others. Regarding the parameters obtained from MP9, each of the parameters of MP9 is variable. MP9 specified a maximum, minimum and decrement value for each parameter. The firmware will first attempt to set each parameter to the maximum value, and attempt to allocate memory based on this maximum value.

The fields of the C-language structure hold parameters that may be set to a maximum value, as shown in method step 105. The number of attempts that the program has tried to successfully allocate memory is also stored in the program for later use, as shown in method step 110, labeled "Attempts=0", which feeds into method step 115 labeled "Reset SOD Allocation System" and may be stored therein. At method step 115 labeled "Reset SOD Allocation System" a certain particular or predetermined set of parameters for a particular memory configuration is stored. In the present invention the SOD Allocation system of step 115 represents a test configuration of parameters forming configuration data relating to the storage system by way of resource parameters particular to the resources for a storage system under consideration, such as Virtual Ports, Host Credits, High Priority Queue Depth, Targets, Initiators, Target Commands, Expanders, Enclosurephys, Enclosures, Trace Buffer Size, Raid Resync Buffer Size, and Route Table Size (but the invention is not limited to these parameters), that in a preferred embodiment form an array of resource descriptors. Parameters can include type of memory (e.g. DMA-able), speed of memory, advanced memory features (e.g. tightly coupled memory, data catch et. al.). The parameters vary based upon the application, as can be appreciated by one of ordinary skill from the teachings herein. Some other parameters may include frame size (buffers used for communication), debug resource allocation (buffers in general), virtual functions and virtualization resources (zero if off, non-zero if on) and the like, as is obvious to one of ordinary skill from the teachings herein.

If memory can be allocated based on the parameters in the SOD Allocation System of box 115, as explained further herein, the parameters do not have to be changed and the memory allocation program can terminate; however, if the memory allocation fails because of the wrong type or size of memory for any of the resources found, then the firmware resets the memory areas back to predetermined Start of Day (SOD) parameter values. Further, using the present invention, resource parameters have initial values and minimum values; one can reach the minimum value of a single resource parameter before the other parameters are at a minimum. Finally, if all parameters go to minimum values, and the allocation of memory experiment fails, then one can apply parameters internal to the firmware (not included in the parameters) to achieve a memory configuration, or, one can reach a fault condition and fail.

In decision box 120 labeled "Minimized==Num Resources?", the program in accordance with the present invention checks to see if parameters are set at a minimum; if they are, control passes along the "Yes" branch to box 125 labeled "Use Internal Minimum or Fail", where internal minimum values are used, that can be stored in the firmware of the present invention, and the program proceeds to the next step box 130, or the parameters is set to a "fail" condition, meaning memory could not be allocated with this parameter, and the configuration is unsuccessful (FAIL). Thus, if all parameters go to minimum values, and the allocation of memory experiment fails, then one applies the values of the parameters internal to the firmware at step box 125 labeled "Use Internal Minimum or Fail", to achieve a memory configuration, or, failing memory configuration using the internal minimums, one can reach a fault condition and fail, and the program can terminate after step box 125.

If not, then the program proceeds to allocate memory based on the actual current field values, as indicated in box 130. If memory is successfully configured, then control proceeds along the "Yes" branch of decision box 135 labeled "Successful?", to method step 140, labeled "Done", and the program stops. If, however, insufficient memory is available for this particular parameter, the parameter will be changed, as explained further herein, and the allocation attempt will be repeated.

Thus, in FIG. 1 in the decision box method step 135 labeled "Successful?", a check is made for each resource if memory configuration was not successful, as labeled in the box "For Each Resource", step 145. Next, the parameters are decremented by a predetermined amount from their actual current values, as indicated by the box 150 labeled "Subtract 'Decrement' from 'Actual'". One can decrement a value of a parameter to reach a minimum for a single resource before the other resources are set to a minimum value.

In step 155, labeled "Actual<Minimum?" the actual values of the parameters are checked against the minimum values, and, if they are less than the minimum values, control passes to step 160 labeled "Set Actual to Minimum" and the parameters are set to a predetermined default minimum value, and control proceeds to decision box 165 labeled "Last Resource?", otherwise control passes to decision box "Last resource" 165, where the program checks to see if all resources have been accounted for; if not, flow proceeds along the "No" branch back to box 145 and the program repeats, otherwise, flow proceeds to the decision box 170 labeled "Attempts<MaxAttempts?".

A decision box "Attempts<MaxAttempts?" 170 if the number of attempts to configure memory is less than the maximum number of attempts permitted (an arbitrary predetermined number), then flow proceeds along the "Yes" branch back to box 115 labeled "Reset SOD Allocation System" and the process repeats, otherwise, flow proceeds to the box 175 labeled "Set Actual to Minimum", where the values are set to predetermined minimum values. Flow proceeds then to box 180 labeled "Reset SOD Allocation System", where the memory is attempted to be allocated using these minimum values stored in the C-structure of the present invention, as indicated by box 185 labeled "Allocate Memory Based Upon Current Actual Field Values". If memory was configured successfully using these values, as indicated by the decision box 190 labeled "Successful?", then flow proceeds to box 195 labeled "Done", otherwise, if allocation failed, flow proceeds to box 200 labeled "Fail", and they configuration failed (FAIL condition).

As indicated by the flowchart in FIG. 1, typically memory cannot be allocated on the first pass, thus the program of the present invention iterates to find an optimal successful resource allocation and memory configuration allocation, as defined by a particular parameter configuration, for any given memory. In this sense the program of the present invention is dynamic or adaptive in finding a successful optimal configuration of memory for a particular storage system that will fit a given set of resources, achieved through the iteration of the parameters as described herein. Thus the parameters chosen for a successful memory configuration after one or more iterations, as taught herein, based on a plurality of initial parameters, give an optimal, dynamic resource allocation in a storage system. The program of the present invention, as preferably instantiated in firmware, is capable of determining multiple memory configurations from the collection of parameters, with each particular memory configuration of a storage system comprising its own set of a plurality of parameters, which may be the initial parameters or based on the initial parameters after one or more iterations, as taught further herein. A successful configuration of memory in the present invention is the largest memory configuration that fits given the predetermined input parameters. If one starts at the maximum memory achievable, it is the first configuration that fits this memory. If the memory needed for any of the resources does not exist in the quantity required, then the iteration fails for all resources and one decrements all resource parameters until they hit their minimum values.

Turning attention now to FIG. 2, there is shown a table with bytes and memory addresses for a preferred embodiment of the Manufacturing Page 9 (MP9). A C-language structure is shown with fields or members as shown, with storage arranged in the memory addresses as shown, with 0x00 in hexadecimal being the least significant byte address and proceeding upwards from there, for the 32 bits, 0 to 31 as depicted. In lieu of a structure an array may also be used, or any other data construct that achieves the same purpose.

The fields of the structure of MP9 are defined as follows, in the preferred embodiment of the invention, with the bits from the 32 bits that define these fields in square brackets. As obvious to one of ordinary skill from the teachings herein, these fields and this data may vary according to the environment faced by the OEM manufacturer employing the present invention.

It is known in the art to have manufacturing pages per se. The manufacturing pages store information in them, and it is the information that is being used in the present invention. This information is stored in config (configuration) pages, e.g., manufacturing information and the like, as shown below. The following fields may be contained within a single member of an array of resource descriptors.

PageType [31:24]—This field specifies Manufacturing (read-only).

MaxAttempts [31:0]—This field specifies the maximum number of iterations the method of the present invention shall allow before a FAULT condition will be set. This value should be used in conjunction with each of the Decrement values. In addition, the MaxAttempts value should be reasonable (i.e., 100 iterations) to allow the overall method of the present invention to converge quickly.

NumResources [31:0]—This specifies the number of elements in the Resource list contained in the page.

Resource [31:0]—This field specifies Minimum, Maximum and Decrement values for each type of resource. This field also indicates the actual value used after the resource allocation method of the present invention has been applied. The Resource array is indexed via an enumeration value that specifies the resource that the specific index is specifying. FIG. 3 shows the detailed format of this field.

Thus, as shown in FIG. 3, there exist the following fields:

Maximum [31:0]—This field specifies the maximum number of resources that will be allocated for the purpose indicated by the index of this structure. This is the initial value that will be used by the resource allocation method of the present invention.

Decrement [31:0]—This field specifies the amount that will be subtracted from the current number of the associated resource during the next attempt of the resource allocation method of the present invention. The Decrement value should be sized appropriately with consideration of the MaxAttempts value. For example, the Decrement value should be approximately equal to the value of (Maximum−Minimum)/MaxAttempts. This value may be zero.

Minimum [31:0]—This field specifies the minimum acceptable number of resources that will be allocated for the purpose indicated by the index of this structure. If the current number of resources less the Decrement value is less than this value, the current number of resources shall be set to this value.

Actual [31:0]—This field indicates the actual number of resources that was allocated for the purpose indicated by the index of this structure, and is the output result of the method of the present invention, as discussed in connection with the flowchart of FIG. 1. The number of this type of resource is needed for memory configuration, as discussed.

In the present invention, the Resource data section is indexed by enumerated values representing the resource parameters. These resource parameters become data linked to the MP9 data and become part of the configuration data relating to the storage system. Table 1 below, which is a but one embodiment of the present invention, is entitled "Resource Index Values", having four columns labeled "INDEX", "PARAMETER NAME", "DESCRIPTION" describes each of these parameters. The Allocation Unit column indicates that this parameter may be multiplied by the value specified. For example, the allocation unit for High Priority Queue Depth is Virtual Function. If there are 2 Virtual Functions, and the depth that is currently being calculated is 256, then there will be 2 times 256 High Priority Queue entries allocated. This resource data may be stored in firmware and/or non-volatile memory (e.g. flash memory) and is derived from a C-language structure. Though there are many ways to program the present invention, in this embodiment a virtual function is used to designate one set of memory parameters per virtual function, as host-virtualization and storage virtualization are used in the storage art. In the particular instantiation of the present invention the virtual function happens to be a PCI Express virtual function, but in general can be any type of virtualization resource. PCI Express is a hardware entity which represents the number of "host interfaces" a card supports. That is the number of "virtual" PCIe functions that are available for the system to divide between the various OS's running on the system. PCI Express virtual function in the present invention is just one of the available resources.

TABLE 1

Resource Index Values

| INDEX | PARAMETER NAME | DESCRIPTION |
| --- | --- | --- |
| 0 | Virtual Functions | Maximum Number Of Virtual Functions |
| 1 | Virtual Ports | Maximum Number Of Virtual Ports |
| 2 | Host Credits | Maximum Number Of Host Credits (I/O's) |
| 3 | High Priority Queue Depth | Maximum Number Of Entries That May Be Added To The High Priority Queue |
| 4 | Targets | Maximum Number Of Supported Target Devices |
| 5 | Initiators | Maximum Number Of Supported Initiator Devices |
| 6 | Target Commands | Maximum Number Of Target Command Buffers |
| 7 | Expanders | Maximum Number Of Expanders |
| 8 | Enclosurephys | Maximum Number Of Enclosure Phys |
| 9 | Enclosures | Maximum Number Of Enclosures |
| 10 | Trace Buffer Size | Number Of Diagnostic Trace Information |
| 11 | Raid Resync Buffer Size | Number Of Bytes Used For Raid Resynchronization |
| 12 | Route Table Size | Maximum Number Of Expander Route Table Entries |

Virtual Function—This field specifies the number of Virtual Functions to be supported by the IOC. The minimum value that may be specified by this field is 1. The maximum value that may be supported is chip-specific. For chips that do not support host-virtualization, the maximum value that may be supported is 1. A typical usage of this value would be:
1. Maximum=1 (no virtualization supported) or N (maximum supported by chip);
2. Minimum=1;
3. Decrement=0 (typically want to support fixed number)

Virtual Ports—This field specifies the number of Virtual Ports to be supported by the IOC. The minimum value that may be specified by this field is 1. The maximum value that may be supported is 255. A typical usage of this value would be:
1. Maximum=1 to 255
2. Minimum=1
3. Decrement=0

Host Credits—This field specifies the number of Host Credits (also known as Global Credit) to be supported by each IOC. This field effectively indicates the number of IO Requests that may be outstanding to each IOC at any point in time. The minimum value that may be specified by this field is 1. The maximum value that may be supported is 65520. A typical usage of this value would be:
1. Maximum=65520
2. Minimum=100
3. Decrement=100

High Priority Queue Depth—This field specifies the number of requests that may be placed onto the High Priority Queue for each IOC. The minimum value that may be specified by this field is 1. The maximum value that may be supported is 65520. The number actually needed depends upon the task management model utilized by the host drivers. For example, if each initiator I/O may be aborted with an Abort Task, then will need to allocate an entry for each initiator I/O that may be outstanding (i.e. track Host Credits). If instead, task management is only sent on a 1-per-device basis, then will need to only track each target device (i.e. track Targets). A typical usage of this value would be:
1. Maximum=65520
2. Minimum=100
3. Decrement=100

Targets—This field specifies the number of target devices to be supported by the IOC. These include SSP (Serial SCSI Protocol) and SATA target devices. It does not include SMP (Serial Management Protocol) target devices. If the target device is multi-ported, and the IOC is able to see all of the ports, then each port is considered a target. A wideport however only counts as 1. The minimum value that may be specified by this field is 0. The maximum value that may be supported is 65,535. A typical usage of this value would be:
1. Maximum=1 to N
2. Minimum 32 1
3. Decrement=0

Initiators—This field specifies the number of initiator devices to be supported by the IOC. These include only SSP initiator devices. It does not include SMP initiator devices. If the initiator device is multi-ported, and each port is able to communicate with the IOC, then each port is considered an initiator. A wide-port however only counts as 1. The minimum value that may be specified by this field is 0. The maximum value that may be supported is 65,535. A typical usage of this value would be:
1. Maximum=1 to N
2. Minimum=1
3. Decrement=0

Target Commands—This field specifies the number of Target Command Buffers supported by the IOC. This number effectively determines the I/O queue depth supported by each Virtual Port on the IOC. The minimum value that may be specified by this field is 0. The maximum value that may be supported is 65,535. A typical usage of this value would be:
1. Maximum=1 to N
2. Minimum=1
3. Decrement=0

Expanders—This field specifies the number of expanders supported by the IOC. The minimum value that may be specified by this field is 0. The maximum value that may be supported is 65,535. A typical usage of this value would be:
1. Maximum=100
2. Minimum=0
3. Decrement=0

EnclosurePhys—This field specifies the maximum number of phys in a single enclosure. For example, if the largest enclosure supported contains a 36-port expander which additionally includes a virtual SES port, then the number of phys in that controller is 37. Another example, if the enclosure consists of three 12-port expanders with one virtual SES port, then this enclosure also contains 37 phys. The minimum value that may be specified by this field is 0, which would imply a direct-attach mode only. The maximum value that may be supported is 255. A typical usage of this value would be:
1. Maximum=255
2. Minimum=1
3. Decrement=0

Enclosures—This field specifies the maximum number of enclosures supported by the IOC. The minimum value that may be specified by this field is 0, which would imply a direct-attach mode only. The maximum value that may be supported is 255. A typical usage of this value would be:
1. Maximum=255
2. Minimum=1
3. Decrement=0

Trace Buffer Size—This field specifies the number of bytes used internally for diagnostic trace buffer usage. The minimum value that may be specified by this field is 1024. The maximum value that may be supported is only limited by the amount of memory to be dedicated to this functionality. The values should be a multiple of 1 KB. A typical usage of this value would be:
1. Maximum=131,072 (128 KB)
2. Minimum=16,384 (16 KB)
3. Decrement=4,096

RAID Resync Buffer Size—This field specifies the number of bytes used by Integrated RAID drive resynchronization. The minimum value that may be specified by this field is 0 if Integrated RAID is not used. The minimum value if Integrated RAID is enabled is 32 KB. The maximum value that may be supported is only limited by the amount of memory to be dedicated to this functionality. Small values will have a definite resynchronization time impact. The values should be a multiple of 1 KB. A typical usage of this value would be:
1. Maximum=131,072 (128 KB)
2. Minimum=32,768 (32 KB)
3. Decrement=4,096

Route Table Size—This field specifies the maximum number of route table entries that may be found in any supported expander. The minimum value that may be specified by this field is 0 (i.e. direct-attach configurations only, or all expanders are self-configuring). The maximum value is 16,384. A typical usage of this value would be:
1. Maximum=1,024
2. Minimum=0
3. Decrement=0

The present invention may also be utilized as any of the following three usage models, but is not limited to these usage modes:
1. Fixed
2. Maximum I/O Capability
3. Synchronized Parameters These three usage models are defined as follows.

Fixed usage model—this usage is for the expert users that know exactly the configuration(s) that need to be supported and have supplied adequate external memory (if needed) to support the configuration. In this model, each of the parameters will have the Maximum=Minimum and the Decrement will be zero for each parameter.

Maximum I/O Capability usage model—this usage is similar to the Fixed Usage model in that the exact configuration(s) are known, but the user would like to maximize the number of potential outstanding I/O's, by utilizing most of the additional "free" memory. This occurs by allowing the Host Credits value to be sized using this free space. In this model, each of the parameters except the Host Credit parameter will also have the Maximum=Minimum and the Decrement will be zero for each parameter. The Host Credits value then can be allowed to vary across a wide range of Maximum to Minimum values.

Synchronized Parameters usage model—this usage allows for a subset of parameters to all be adjusted simultaneously relative to each other. For example, there is typically a relationship between Enclosures and Target devices (i.e., each enclosure can hold 20 targets). Therefore the Decrement value for Target could be set to 20 and the Decrement value for Enclosures set to 1.

Although the present invention has been described in terms of the preferred embodiments above, numerous modifications and/or additions to the above-described preferred embodiments would be readily apparent to one skilled in the art from the teachings herein. For example, the step-by-step method of the present invention could be replaced by an equation or formula that achieves the same thing, or, in lieu of C-language structures an array may be used, or, in a higher-level OOP language like C++, a class in lieu of a structure may be employed, without detracting from the generality of the present invention. Further, the invention may be applied to varying memory types and sizes. For instance in one configuration one can have internal memory (EDRAM or SRAM) external PBSRAM, external NVSRAM, DDR, external SRAM and FLASH. In other configurations there can be many different asynchronous memory types.

It is intended that the scope of the present invention extends to all such modifications and/or additions and that the scope of the present invention is limited solely by the claims set forth below.

We claim:

1. A non-transitory computer-readable medium bearing program instructions executable to cause one or more processors to:
   access stored configuration data relating to a plurality of storage systems;
   determine a plurality of memory configurations for the plurality of storage systems based on the stored configuration data;
   access the stored configuration data including two or more sets of a plurality of parameters;
   determine multiple memory configurations, the two or more sets of a plurality of parameters including a first set of a plurality of parameters relating to resources in the environment of the plurality of storage systems, the memory configuration of each storage system based on a unique set of a plurality of parameters, the first set of a plurality of parameters each configured to have a maximum, minimum, and decrement value, the two or more sets of a plurality of parameters further including a second set of a plurality of parameters not included as a portion of the first set of parameters;
   allocate memory by collecting the first set of parameter values one or more times at runtime and decrementing from a maximum parameter value to a suitable parameter value for each parameter of the first set of a plurality of parameters, wherein memory allocation is attempted at each parameter value of the first set of parameter values until the suitable parameter value is attained or allocation of memory fails; and
   upon failure of memory allocation with the first set of a plurality of parameters, achieve a memory configuration utilizing the second set of a plurality of parameters.

2. The invention according to claim 1, wherein the program instructions of the non-transitory computer-readable medium are executable to cause one or more processors to: determine a memory configuration from a plurality of memories selected from the group consisting of internal memory EDRAM, internal memory SRAM, external memory PBSRAM, external memory NVSRAM, DDR, external memory SRAM, FLASH memory and asynchronous memory.

3. The invention according to claim 1, wherein program instructions of the non-transitory computer-readable medium are executable to cause one or more processors to iterate to decrement the first plurality of parameters in the configuration data until the memory configuration is achieved.

4. The invention according to claim 3, wherein program instructions of the non-transitory computer-readable medium are executable to cause one or more processors to iterate to decrement the first plurality of parameters from a higher value to a lower value, until a memory configuration is achieved or until a fault condition occurs.

5. The invention according to claim 4, wherein:
   the stored configuration data is persistent data that is alterable and modifiable;
   memory comprising non-volatile memory stores the configuration data;
   an IO port leads to the non-volatile memory, with the configuration data external to the non-transitory computer readable medium, and the configuration data is alterable and modifiable through the IO port; and
   the first set of a plurality of parameters are storage system resource parameters selected from the group consisting of Virtual Ports, Host Credits, High Priority Queue Depth, Targets, Initiators, Target Commands, Expanders, Enclosurephys, Enclosures, Trace Buffer Size, Raid Resync Buffer Size, Route Table Size, memory type, memory speed, frame size buffers, debug resource allocation, virtual functions and virtualization resources.

6. The invention according to claim 1, wherein:
   non-volatile memory stores the configuration data;
   the non-volatile memory is flash memory, and the configuration data is stored as a software construct; and
   the configuration data is persistent data that is alterable and modifiable during Start of Day.

7. The invention according to claim 6, wherein:
   the first set of a plurality of parameters are storage system resource parameters selected from the group consisting of Virtual Ports, Host Credits, High Priority Queue Depth, Targets, Initiators, Target Commands, Expanders, Enclosurephys, Enclosures, Trace Buffer Size, Raid Resync Buffer Size, Route Table Size, memory type, memory speed, frame size buffers, debug resource allocation, virtual functions and virtualization resources; and
   the memory configuration is achieved according to a usage model selected from the group consisting of a fixed usage model, a maximum I/O capability usage model and a synchronized parameters usage model.

8. The invention according to claim 1, wherein:
   the first set of a plurality of parameters are storage system resource parameters selected from the group consisting of Virtual Ports, Host Credits, High Priority Queue Depth, Targets, Initiators, Target Commands, Expanders, Enclosurephys, Enclosures, Trace Buffer Size, Raid Resync Buffer Size, Route Table Size, memory type, memory speed, frame size buffers, debug resource allocation, virtual functions and virtualization resources.

9. The invention according to claim 1, wherein:
   the stored configuration data is persistent data that is alterable and modifiable;
   memory comprising non-volatile memory stores the configuration data;
   an IO port leads to the non-volatile memory, with the configuration data external to the non-transitory computer readable medium, and the configuration data is alterable and modifiable through the IO port;
   the memory configuration allocates memory from a memory selected from the group consisting of internal memory EDRAM, internal memory SRAM, external memory PBSRAM, external memory NVSRAM, DDR, external memory SRAM, FLASH memory and asynchronous memory; and,
   the first set of a plurality of parameters are storage system resource parameters selected from the group consisting of Virtual Ports, Host Credits, High Priority Queue Depth, Targets, Initiators, Target Commands, Expanders, Enclosurephys, Enclosures, Trace Buffer Size, Raid Resync Buffer Size, Route Table Size, memory type, memory speed, frame size buffers, debug resource allocation, virtual functions and virtualization resources.

10. A method for allocation of memory in a plurality of storage systems comprising the steps of:
providing program instructions in a plurality of storage systems;
storing one or more sets of configuration data relating to a first set of a plurality of parameters related to the plurality of storage systems, the memory configuration of each storage system based on a unique set of the first plurality of parameters;
configuring each of the first set of a plurality of parameters to have a maximum, minimum, and decrement value;
configuring a second set of parameters not included as a portion of the first set of parameter;
accessing said stored data with said program instructions;
determining a plurality of memory configurations for one or more sets of stored configuration data for a plurality of storage systems by allocating memory to achieve the plurality of memory configurations, the allocation of memory including:
collecting the first set of parameter values one or more times at runtime;
decrementing from a maximum parameter value to a suitable parameter value for each parameter of the first set of a plurality of parameters, wherein memory allocation is attempted at each parameter value of the first set of parameter values until the suitable parameter value is attained or allocation of memory fails; and
upon failure of memory allocation with the first set of a plurality of parameters, achieving a memory configuration utilizing the second set of a plurality of parameters.

11. The method according to claim 10, further comprising the steps of:
iterating through said program instructions to decrement the first set of a plurality of parameters from a higher value to a lower value, until the one or more memory configurations for a particular storage system is achieved.

12. The method according to claim 11, further comprising the steps of:
storing the one or more sets of configuration data comprising a first set of a plurality of parameters as persistent data in nonvolatile memory, said configuration data being alterable and modifiable by said program instructions.

13. The method according to claim 12, further comprising the steps of:
storing said program instructions;
said non-volatile memory is flash memory;
selecting said data from the first set of a plurality of parameters that are storage system resource parameters selected from the group consisting of Virtual Ports, Host Credits, High Priority Queue Depth, Targets, Initiators, Target Commands, Expanders, Enclosurephys, Enclosures, Trace Buffer Size, Raid Resync Buffer Size, Route Table Size, memory type, memory speed, frame size buffers, debug resource allocation, virtual functions and virtualization resources.

14. The method according to claim 10, further comprising the steps of:
determining the one or more memory configurations from a plurality of memories selected from the group consisting of: internal memory EDRAM, internal memory SRAM, external memory PBSRAM, external memory NVSRAM, DDR, external memory SRAM, FLASH memory and asynchronous memory.

15. The method according to claim 14, further comprising the steps of:
storing said program instructions in a non-transitory computer readable medium;
storing the configuration data as persistent data in nonvolatile memory suitable for modification during runtime of said program instructions;
decrementing said plurality of parameters from a higher to a lower value through iterations, until a memory configuration is achieved or until a memory configuration fails;
utilizing a second set of a plurality of parameters not included in the first set of parameters to achieve a memory configuration, wherein the memory configuration is achieved through steps according to a usage model selected from the group consisting of a fixed usage model, a maximum I/O capability usage model and a synchronized parameters usage model.

16. A system for a plurality of storage systems comprising:
memory configuration means for allocating memory for a plurality of storage systems, said memory configuration means stored in non-transitory computer readable medium; and
means for storing configuration data of said memory for said plurality of storage system, said data comprising a first set of a plurality of parameters relating to resources in the environment of said plurality of storage systems, the memory configuration means of each storage system based on a unique set of the plurality of parameters, said data storing means comprising non-volatile memory,
the first set of a plurality of parameters each configured to have a maximum, minimum, and decrement value,
said memory configuration means comprising program instructions configured to:
collect the first set of parameter values one or more times at runtime;
decrement from a maximum parameter value to a suitable parameter value for each parameter of the first set of a plurality of parameters, wherein memory allocation is attempted at each parameter value of the first set of parameter values until the suitable parameter value is attained or allocation of memory fails, said first set of parameters comprising said data stored as persistent data, said data being alterable and modifiable at runtime, wherein said memory configuration means is able to determine said particular memory configuration for a particular storage system based on said predetermined first set of parameters when decrementing through said first set of a plurality of parameters,
upon failure of memory allocation with the first set of a plurality of parameters, achieve a memory configuration utilizing a second set of a plurality of parameters not included in the first set of parameters.

* * * * *